United States Patent [19]

Kato et al.

[11] Patent Number: 4,769,179
[45] Date of Patent: Sep. 6, 1988

[54] FLAME-RETARDANT RESIN COMPOSITIONS

[75] Inventors: Hiroshi Kato; Kazuhiko Kanemitsuya, both of Nishinomiya; Kiyoshi Furukawa, Kobe, all of Japan

[73] Assignee: Mitsubishi Cable Industries, Limited, Amagasaki, Japan

[21] Appl. No.: 16,440

[22] Filed: Feb. 19, 1987

Related U.S. Application Data

[63] Continuation-in-part of Ser. No. 841,135, Mar. 19, 1986, abandoned.

[30] Foreign Application Priority Data

| Mar. 20, 1985 [JP] | Japan | 60-56302 |
| Mar. 20, 1985 [JP] | Japan | 60-56306 |
| Mar. 20, 1985 [JP] | Japan | 60-56307 |

[51] Int. Cl.$^4$ .............. C09K 21/00; C08K 9/00; C08K 5/49
[52] U.S. Cl. .............. 252/609; 252/601; 521/107; 521/907; 522/76; 522/79; 522/110; 523/200; 523/205; 523/207; 524/115; 524/140; 524/147; 524/581
[58] Field of Search .......... 252/609, 601, 610, 611; 521/106, 107, 907; 522/6, 74, 76, 82, 79, 83, 110, 112, 184, 186, 189; 523/200, 205, 207, 451; 524/81, 115, 136, 140, 147, 525, 528, 581

[56] References Cited

U.S. PATENT DOCUMENTS

| 3,412,125 | 11/1968 | Welch et al. ........... 252/609 |
| 4,171,330 | 10/1979 | Kyo et al. ............. 525/180 |
| 4,182,799 | 1/1980 | Rodish ................ 252/609 |
| 4,430,470 | 2/1984 | Taniguchi et al. ...... 252/609 |
| 4,525,494 | 6/1985 | Andy ................. 523/200 |
| 4,549,041 | 10/1985 | Shingo et al. ......... 252/609 |
| 4,575,184 | 3/1986 | Veno et al. ........... 252/609 |

FOREIGN PATENT DOCUMENTS

| 1519685 | 8/1978 | European Pat. Off. |
| 0007748 | 2/1980 | European Pat. Off. |
| 0170176 | 9/1984 | Japan ................ 252/609 |
| 60-56301 | 3/1985 | Japan . |
| 60-56303 | 3/1985 | Japan . |
| 60-56304 | 3/1985 | Japan . |
| 60-56305 | 3/1985 | Japan . |
| 60-56308 | 3/1985 | Japan . |
| 60-56309 | 3/1985 | Japan . |
| 60-56310 | 3/1985 | Japan . |
| 2041960 | 9/1980 | United Kingdom . |
| 2092599 | 8/1982 | United Kingdom ...... 252/609 |

*Primary Examiner*—Stephen J. Lechert, Jr.
*Assistant Examiner*—Howard J. Locker
*Attorney, Agent, or Firm*—Armstrong, Nikaido, Marmelstein & Kubovcik

[57] ABSTRACT

This invention provides a flame-retardant resin composition comprising (A) about 100 parts by weight of at least one resin selected from the group consisting of ethylene-vinyl acetate copolymer, ethylene-ethyl acrylate copolymer, isobutylene-isoprene copolymer and ethylene-propylene-diene terpolymer, (B) about 50 to about 300 parts by weight of a hydrate of metallic oxide, and (C) about 0.05 to about 5 parts by weight of a phosphorus-containing titanate coupling agent, the composition having been already crosslinked by use of about 0.1 to about 20 parts by weight of a crosslinking agent or by irradiation of ionizable radiation.

The composition of the invention has an outstanding flame retardancy and can be made into a molded product capable of exhibiting fully useful mechanical and electrical characteristics.

11 Claims, No Drawings

FLAME-RETARDANT RESIN COMPOSITIONS

This application is a continuation in part application of U.S. application Ser. No. 841,135, (now abandoned) filed Mar. 19, 1986.

The present invention relates to flame-retardant resin compositions.

Heretofore known as flame-retardant resin compositions are those prepared using a halogen-containing polymer or by adding an organohalogen flame retardant to non-halogenated polymer. However, the products obtained with use of such flame-retardant resin compositions, although self-extinguishable when taken out from flames, have the drawbacks that they undergo continuous combustion to burn out while in a flame of high temperature as in the event of a fire, they produce a large quantity of smoke, or thermally decompose to release a corrosive or highly toxic acid gas and thus result in a secondary disaster.

On the other hand, attempts have been made to incorporate a halogen-free flame retardant into olefin resin to overcome the above drawbacks. However, the halogen-free flame retardant needs to be used in a large amount to give fully useful flame retardancy to the resulting resin composition. This results in the following drawbacks. When a large quantity of halogen-free flame retardant is admixed with olefin resin, the resulting resin composition, when molded or extruded, exhibits seriously reduced mechanical characteristics especially in respect of tensile strength and elongation and greatly impaired aging characteristics and electrical characteristics, failing to serve satisfactorily. Thus, halogen-free resin compositions still remain to be developed which are outstanding in flame retardancy and which, molded or extruded, exhibit fully useful mechanical and electrical characteristics.

An object of the present invention is to provide a halogen-free resin composition having high flame retardancy.

Another object of the present invention is to provide a flame-retardant resin composition which can be molded into a product capable of exhibiting fully useful mechanical characteristics and electrical characteristics.

Other features of the present invention will become apparent from the following description.

The flame-retardant resin composition of the present invention comprises (A) about 100 parts by weight of at least one resin selected from the group consisting of ethylene-vinyl acetate copolymer (EVA), ethylene-ethyl acrylate copolymer (EEA), isobutylene-isoprene copolymer (butyl rubber, IIR) and ethylene-propylene-diene terpolymer (EPDM), (B) about 50 to about 300 parts by weight of a hydrate of metallic oxide, and (C) about 0.05 to about 5 parts by weight of a phosphorus-containing titanate coupling agent, the composition having been already crosslinked by use of about 0.1 to about 20 parts by weight of a crosslinking agent or by irradiation of ionizable radiation.

Examples of useful EVA copolymers for use in the present invention are those containing about 5 to about 70 wt. % of vinyl acetate, such as ethylene-vinyl acetate copolymers having a vinyl acetate content of about 5 to about 25 wt. % and a melt flow rate (MFR) of about 0.5 to about 20 as measured according to ASTM D1238, and ethylene-vinyl acetate copolymers having a vinyl acetate content of about 30 to about 75 wt. % and a Mooney viscosity of about 5 to about 65 at 100° C. Of these, especially suitable are ethylene-vinyl acetate copolymers which are about 10 to about 25 wt. % in vinyl acetate content and about 1.0 to about 10 in MFR, and ethylene-vinyl acetate copolymers which are about 40 to about 73 wt. % in vinyl acetate content and about 15 to about 40 in Mooney viscosity at 100° C. More specific examples of such copolymers are an ethylene-vinyl acetate copolymer which is 3.0 in MFR and 15 wt. % in vinyl acetate content (Evatate H2011, product of Sumitomo Chemical Co., Ltd.), ethylene-vinyl acetate copolymer which is 1.5 in MFR and 20 wt. % in vinyl acetate content (Evatate H2031, product of Sumitomo Chemical Co., Ltd.), ethylene-vinyl acetate copolymer which is 2.0 in MFR and 15 wt. % in vinyl acetate content (NUC8450, product of Nippon Unicar Co., Ltd.), ethylene-vinyl acetate copolymer which is 2.0 in MFR and 25 wt. % in vinyl acetate content (Yukalon V505, product of Mitsubishi Petrochemical Co., Ltd.), ethylene-vinyl acetate copolymer which is about 20 in Mooney viscosity at 100° C. and 45 wt. % in vinyl acetate content (Levapren 450, product of Bayer AG.), ethylene-vinyl acetate copolymer which is about 20 in Mooney viscosity at 100° C. and 50 wt. % in vinyl acetate content (Levapren 500, product of Bayer AG.), etc.

The EPDM polymers to be used can be a wide variety of those heretofore known. Examples of desirable EPDM terpolymers are ethylene-propylene-diene terpolymers which are prepared by polymerizing ethylene, propylene and a third component such as dichloropentadiene, ethylidene-norbornene, 1,4-hexadiene or the like and in which the amount of the third component is about 8 to about 25, preferably about 9 to about 15 in terms of iodine value, the terpolymers being about 30 to about 100, preferably about 30 to about 60 in crude rubber Mooney viscosity. More specific examples of such EPDM polymers are EP21 and EP51 (products of Nippon Synthetic Rubber Co., Ltd.), Esprene 301, Esprene 501A and Esprene 505 (products of Sumitomo Chemical Co., Ltd.), EPT4021 and EPT1045 products of Mitsui Petrochemical Industries, Ltd.), etc.

Examples of useful EEA copolymer are those which are about 0.4 to about 35 in MFR and about 5 to about 30 wt. % in ethyl acrylate (EA) content, preferably about 0.5 to about 28 in MFR and about 5 to about 20 wt. % in EA content. More specific examples of such EEA copolymers are NUC-6220, DQDJ-6182 and NUC-6570 (products of Nippon Unicar Co., Ltd.), A170, A270 and T4340-16 (products of Nippon Petrochemical Co., Ltd.), XC-300E and C-400K (products of Mitsubishi Petrochemical Co., Ltd.), A-701, A-702, A-706 and A-710 (products of Mitsui-Du Pont Polychemical Co., Ltd.), etc.

Examples of useful IIR include preferably those having an unsaturation degree of about 0.2 to about 3.0 mole % and a Mooney viscosity of about 35 to about 100 at 100° C., more preferably those having an unsaturation degree of about 0.5 to about 2.5 mole % and a Mooney viscosity of about 40 to about 90 at 100° C. Specific examples of preferred IIR are JSR Butyl 035, 218 and 268 (products of Nippon Synthetic Rubber Co., Ltd.), ESSO Butyl 218, 268 and 365 (products of ESSO Petrochemical, Inc.), Polysar Butyl 100, 200 and 301 (products of Polysar Limited), etc.

The EVA, IIR, EPDM or EEA polymer is useful as crosslinked. Various known EVA, IIR, EPDM or EEA polymers are usable as such. More specifically, the EVA, IIR, EPDM or EEA can be crosslinked by adding to the polymer at least one of crosslinking agents such as organic peroxides, sulfur-containing organic compounds, quinone dioximes, phenol-formaldehyde resins, halogenated compounds and the like, followed by heat treatment. When at least one of the crosslinking coagents such as organic compounds having at least two groups containing a reactive carbon-to-carbon double bond in the molecule and the like is added to the polymer, the crosslinking can be accomplished more preferably. Irradiation of the polymer with electron rays can give such a crosslinked polymer without a crosslinking agent.

According to the present invention, the component (A) can be a mixture of EVA with EEA and/or IIR. The EVA to EEA and/or IIR mixing ratio, which is not limited specifically but can be determined from a wide range, is usually about 95-50: about 5-50, preferably about 90-70: about 10-30, by weight.

Further according to the invention, the component (A) can be a mixture of EEA with IIR and/or EPDM. The EEA to IIR and/or EPDM mixing ratio by weight, which is not limited specifically but is widely variable, is usually about 95-50: about 5-50, preferably about 90-70: about 10-30.

A small amount of linear polyethylene can be admixed with the component (A) of the invention. The linear polyethylene is a copolymer of an olefin having 4 to 16 carbon atoms and ethylene. It is a substantially linear polyethylene having a density higher than 0.90 but not higher than 0.96 and a MFR of 0.1 to 20. The linear polyethylene is prepared, for example, by the following process.

A mixture of ethylene and an olefin having 4 to 6 carbon atoms is polymerized at low pressure in the presence of a catalyst. The mixing ratio between ethylene and olefin is usually about 3 to about 20 parts by weight, preferably about 5 to about 10 parts by weight, of the latter per 100 parts by weight of the former. Examples of useful catalysts are so-called Phillips catalysts typical of which is chromium oxide supported on silica, alumina, zirconia, or silica alumina as a carrier, Ziegler catalysts comprising the combination of compound of a transition metal from Groups IV to VIII of the Periodic Table and an organometallic compound of a metal from Groups I to IV of the Table, etc. More specific examples of useful Ziegler catalysts are combinations of $TiCl_4$ and alkyl aluminums (such as $Al_2(Et_3)Cl_3$, $Al(Et)_2Cl$ and $AlEt_3$) Also useful is a mixture of organomagnesium compound such as $n-Bu_2Mg.1$-/$6AlEt_3$, the above Ti compound and a organometallic halide. The catalyst is used usually in an amount of about 0.01 to about 50 parts by weight, preferably about 0.05 to about 20 parts by weight, per 100 parts by weight of the mixture of ethylene and olefin having 4 to 16 carbon atoms. The pressure to be applied for the polymerization is usually atmospheric pressure to about 20 atm., preferably atmospheric pressure to about 10 atm. Examples of preferred processes for preparing the linear polyethylene are disclosed more specifically in Unexamined Japanese Patent Publications (Japan Kokai) Nos. 51-112891, 55-45722 and 55-113542 and U.S. Pat. No. 3,957,448.

Of the linear polyethylenes useful for the present invention, especially suitable are those wherein the olefin comonomer copolymerized with the ethylene chain has about 4 to about 10 carbon atoms. More specifically, the most suitable polyethylenes are those wherein the comonomer is butene-1, octene-1 or 4-methylpentene-1. Further of the useful linear polyethylenes, desirable are those having a density of about 0.91 to about 0.96, preferably about 0.91 to about 0.94, more preferably about 0.911 to about 0.925 as measured according to ASTM D1505. Such polyethylenes are preferably about 0.1 to about 10 in MFR as measured according to ASTM D1238. Examples of such linear polyethylenes are Mitsubishi Polyethylene-LL H20E, F30F and F30H (products of Mitsubishi Petrochemical Co., Ltd.), Ultzex 2020L, 3010F and 3021F (products of Mitsui Petrochemical Industries, Ltd.), DFDA-7540 (product of Union Carbide Corporation), NUCG-5651, GS-650, GRSN-7047 and GRSN-7042 (products of Nippon Unicar Company, Ltd.), Idemitsu Polyethylene-L 0134H and 0234H (products of Idemitsu Petrochemical Co., Ltd.), etc.

The linear polyethylene is incorporated into the component (A) usually in an amount of up to about 9 wt. %, preferably up to about 8 wt. %, based on the entire amount of the component (A).

The hydrate of metallic oxide to be used as the component (B) of the invention is, for example, a hydrate of oxide of a metal element from Groups Ia, IIa, IIIb, IVa and IVb of the Periodic Table, or a complex salt or compound of such a hydrate and the carbonate of a metal element from Groups Ia and IIa of the table. Examples of useful hydrates are $Al_2O_3.nH_2O$ (wherein n is 0.5 to 6, particularly 2.5 to 3.5, hereinafter referred to as "hydrated alumina"), $MgO.nH_2O$ (wherein n is 0.5 to 5, particularly 1.5 to 2.5, hereinafter referred to as "hydrated magnesia"), $BaO.9H_2O$, $BaO.H_2O$, $ZrO.2H_2O$, $SnO.nH_2O$ (wherein n is 1 to 10), $3MgCO_3.Mg(OH)_2.3H_2O$, $6MgO.Al_2O_3.H_2O$, $NaCO_3.Al_2O_3.nH_2O$ (wherein n is 1 to 10), $Na_2O.B_2O_3.5H_2O$, etc. These hydrates are usable singly, or at least two of them can be used in admixture. In particle size, these metallic oxide hydrates are usually up to about 10 μm, preferably up to about 5 μm. Generally, particle sizes of about 0.1 to about 5 μm are desirable for use. Of these hydrates, hydrated alumina and hydrated magnesia are especially preferred. Examples of such hydrated aluminas are HYGELLITE H-42M (product of Showa Light Metal Co., Ltd.), B1403 and B1403S (products of Nippon Light Metal Co., Ltd.), etc. Suitable hydrated magnesias are those which are 3 to 15 m²/g in specific surface area as determined by the BET method and 0% for 5-micron or larger particles in particle size distribution as determined by the Loozex method. Examples of such hydrated magnesias are KISUMA 5B, KISUMA 5A and KISUMA 5E (products of Kyowa Kagaku Kogyo Co., Ltd.), KX-4S (product of Asahi Glass Co., Ltd.), etc.

According to the present invention, usually about 50 to about 300 parts by weight, preferably about 70 to about 250 parts by weight, more preferably about 80 to about 200 parts by weight, of the component (B) is admixed with 100 parts by weight of the component (A). Use of more than 300 parts by weight of the component (B) entails the drawback that the resulting resin composition exhibits impaired mechanical characteristics. Conversely, with less than 50 parts by weight of the component (B) present, the resin composition has the drawback of reduced flame retardancy.

Examples of preferred phosphorus-containing titanate coupling agents for use as the component (C) of the present invention are organotitanates represented by the formula

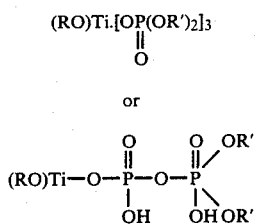

wherein R is alkyl group having 3 to 12 carbon atoms, and R' is alkyl group having 1 to 18 carbon atoms. More specific examples of such titanates are tetraisopropyl di(dioctylphosphite)titanate (KR-41B), tetraoctyl di(ditridecylphosphite)titanate (KR-46B), tetraisopropyl di(dilaurylphosphite)titanate (KR-36C), tetra(2,2-diallyloxymethyl-1-butoxy) di(di-tridecyl)phosphitetitanate (KR-55), isopropyl tris(dioctylpyrophosphate)titanate (KR-38S), bis(dioctylpyrophosphate)oxyacetatetitanate (KR-138S) and bis(dioctylpyrophosphate)ethylenetitanate (KR-238S), these titanates being products of Kenrich Petrochemicals, Inc. Especially preferable among these examples are tetraisopropyl di(dioctylphosphite)titanate, tetraisopropyl di(dilaurylphosphite)titanate, tetra(2,2-diallyoxymethyl-1-butoxy) di(di-tridecyl)phosphitetitanate, isopropyl tris(dioctylpyrophosphate)titanate and bis(dioctylpyrophosphate)oxyacetate-titanate.

The phosphorus-containing titanate coupling agent is used usually in an amount of about 0.05 to about 5 parts by weight, preferably about 0.2 to about 3 parts by weight, per 100 parts by weight of the component (A). Use of more than 5 parts by weight of the coupling agent results in the drawback that the composition obtained exhibits lower flame retardancy and impaired mechanical characteristics. Conversely, if less than 0.05 part by weight of the coupling agent is used, the resulting composition has the drawback of lower processability.

According to the present invention, it is desirable to incorporate an organic peroxide into the composition to effect crosslinking. Various known organic peroxides are usable for this purpose. Examples of suitable organic peroxides are tert-butylcumyl peroxide (Kayabutyl C, product of Kayaku Nouly Corp.), α,α'-bis(tert-butylperoxy-m-isopropylbenzene) (Perbutyl P, product of Nippon Oils & Fats Co., Ltd.), 2,5-dimethyl-2,5-ditertbutylperoxy)hexyne (Perhexa 25B, product of Nippon Oils & Fats Co., Ltd.), dicumyl peroxide (Percumyl D, product of Nippon Oils & Fats Co., Ltd.), etc. Of these, tert-butylcumyl peroxide, α,α'-bis(tert-butylperoxy-m-isopropylbenzene) and dicumyl peroxide are especially suitable.

The organic peroxide is used usually in an amount of about 1 to about 10 parts by weight, preferably about 1.5 to about 5 parts by weight, per 100 parts by weight of the component (A). Use of more than 10 parts by weight of the organic peroxide results in a tendency for the resin composition obtained to exhibit impaired properties in respect of mechanical and aging characteristics, etc., hence undesirable. Presence of less than 1 part by weight of the peroxide is also undesirable since it then becomes difficult to effect crosslinking.

Examples of crosslinking agents useful when IIR is used as the polymer in the invention are compounds selected from the group consisting of sulfur-containing organic compounds such as tetramethylthiuram disulfide, tetraethylthiuram disulfide, 2-mercaptobenzthiazole, tetramethylthiuram monosulfide, dibenzothiazyl disulfide and the like; quinone dioximes such as p-benzoquinone dioxime and the like; mixtures of phenol-formaldehyde resins and halogenated compounds; etc. Also usable as such crosslinking agents are those heretofore used for IIR.

It is also desirable to incorporate a crosslinking coagent into the composition. Various known compounds are usable as crosslinking coagents insofar as they have at least two groups containing a reactive carbon-to-carbon double bond in the molecule. Examples of useful crosslinking coagents are aromatic polyfunctional compounds such as divinylbenzene, diallyl phthalate, diallyl isophthalate, 4,4'-isopropylidenediphenol bis(diethyleneglycolmethacrylate)ether, triallyltrimellitate and 2,2'-bis(4-acryloxy diethoxyphenyl)propane, aliphatic polyfunctional compounds such as syn-1,2-polybutadine, 1,4-butanediol diacrylate, N,N'-methylenebisacrylamide, ethylene glycol dimethacrylate, neopentyl glycol dimethacrylate, trimethylolpropane trimethacrylate, pentaerythritol tetramethacrylate, 1,6-hexanediol diacrylate, diethylene glycol dimethacrylate, triethylene glycol dimethacrylate, 1,6-hexanediol dimethacrylate and tetrahexanediol dimethacrylate, alicylic polyfunctional compounds such as triallyl isocyanurate, triallyl cyanurate, triacryloylhexahydro-1,3,5-triazine and diacryl chlorendate, metal-containing polyfunctional compounds such as aluminum acrylate, aluminum methacrylate, zinc acrylate, zinc methacrylate, magnesium acrylate, magnesium methacrylate, calcium acrylate, calcium methacrylate, zircon acrylate and zircon methacrylate, etc. Of these compounds, especially suitable are triallyl isocyanurate, triallyl cyanurate, triacryloylhexahydro-1,3,5-triazine and the like.

The crosslinking coagent is incorporated into the present composition usually in amount of about 0.1 to about 10 parts by weight, preferably about 0.3 to about 5 parts by weight, per 100 parts by weight of the component (A). Use of more than 10 parts by weight of the coagent is not desirable since the resulting composition then tends to exhibit lower mechanical and aging characteristics. Use of less than 0.1 part by weight of the agent is not desirable either, since the agent then fails to produce the contemplated effect.

The composition of the invention can be crosslinked also by irradiation of ionizable radiation. Examples of most suitable ionizable radiations are electron beam and gamma-ray.

With the present invention, it is desirable to incorporate an antioxidant into the composition. Examples of useful antioxidants are hindered phenol types and amine types. Various hindered phenol type antioxidants heretofore known are usable which include, for example, [methylene-3-(3,5-di-tert-butyl-4-hydroxyphenol)propionate]methane (Irganox 1010, product of CIBA GEIGY Corp.), 2,2-thio[diethyl-bis-3-(3,5-di-tert-butyl-4-hydroxyphenol)propionate] (Irganox 1035, product of CIBA GEIGY Corp.), 4,4'-thiobis(3-methyl-6-tertbutylphenol) (SUNTONOX, product of Monsanto Co.), 4,4'-methylenebis(3,5-di-tert-butylphenol) (Ionox 220, product of ICI, England), etc. Various amine type antioxidants heretofore known are also usable, which include, for example, Antioxidant DDA (DDA, product of Bayer AG.), N,N'-di-β-naphthyl-p-phenylenediamine (Nocrac White, product of Ohuchi Shinko Co., Ltd.), N,N'-diphenyl-p-phenylenediamine (Nocrac DP, product of Ohuchi Shinko Co., Ltd.), N,N'-diisopropyl-p-phenylenediamine (Antioxidant No.23, product of E.I. du Pont de Nemours & Co.), N,N'-bis(1-methylheptyl)-p-phenylenediamine (Eastzone 30, product of Eastman Chemical Products, Inc.), phenylhexyl-p-phenylenediamine (ANTO$_3$ "E", product of Pennwalt Corp.), N,N'-bis(1-ethyl-3-methylpentyl)-p-phenylenediamine (Flexzon 8-L, product of Uniroyal Chemical Co.), N,N'-di-β-naphthyl-p-phenylenediamine (Nonflex F, product of Seiko Kagaku Co, Ltd.), 2-mercaptomethylbenzimidazole (Nocrac MMB, product of Ohuchi Shinko Kagaku Co., Ltd.), 2-mercaptomethylbenzimidazole zinc salt (Nocrac MMBZ, product of Ohuchi Shinko Co., Ltd.), etc. These agents are usable singly, or at least two of them are usable in admixture.

When the component (A) used is an ethylene-vinyl acetate copolymer which contains about 10 to about 25 wt. % of vinyl acetate and has MFR values of about 1.0 to about 10, it is desirable that the antioxidant be a hindered phenol compound. When the component (A) used is an ethylene-vinyl acetate copolymer containing about 40 to about 73 wt. % of vinyl acetate and having a Mooney viscosity of about 15 to about 40 at 100° C., it is especially desirable to use a hindered phenol or amine antioxidant. Further when EPDM is used for the component (A), it is especially preferable to use an amine antioxidant.

The antioxidant is used usually in an amount of about 0.1 to about 5 parts by weight, preferably about 0.2 to about 2.5 parts by weight, more preferably about 0.3 to about 1.5 parts by weight, per 100 parts by weight of the component (A). Use of more than 5 parts by weight of the antioxidant fails to produce a noticeably improved effect and is therefore economically undesirable. With less than 0.1 part by weight of the antioxidant present, it is difficult to achieve the intended aging preventing effect, hence undesirable.

Preferably, the composition of the present invention has incorporated therein an auxiliary flame retardant such as red phosphorus, zinc borate, titanium dioxide or the like. Examples of useful red phosphorus flame retardants are a wide variety of those commercially available, for example, those at least about 80% in red phosphorus content, up to about 0.8% in weight loss on drying and up to about 7% in plus 74-mesh content. It is desirable that the surface of the red phosphorus particles be covered with a thermosetting resin such as phenolformalin resin or the like. Examples of such red phosphorus flame retardants are NOVARED #120 and NOVARED #120UF (products of Rinkagaku Kogyo Co., Ltd.), etc.

Useful zinc borates are a wide variety of those commercially available. For example, it is desirable to use one represented by the formula $2ZnO.3B_2O_3.3.5H_2O$, about 2 to about 10μ in particle size and about 2.6 to about 2.8 g/cm$^3$ in crystalline density, such as Zinc Borate 2335 (product of Borax Holdings Ltd., England), etc.

Useful titanium dioxides are those commercially available, for example, those containing at least about 90% of TiO$_2$ and wholly minus 100 mesh in particle size, or those containing at least about 90% of TiO$_2$, including none of plus 149-micron particles and having a water content of up to about 0.7%. Examples of such materials are TITONE A-150 and TITONE R-650 (products of Sakai Kagaku Kogyo Co., Ltd.).

According to the present invention, usually about 0.5 to about 50 parts by weight, preferably about 2 to about 25 parts by weight, of the auxiliary flame retardant is used per 100 parts by weight of the component (A). Use of more than 50 parts by weight of the auxiliary flame retardant is not desirable since the resulting resin composition then tends to exhibit lower mechanical characteristics. Conversely, presence of less than 0.5 part by weight of the auxiliary flame retardant results in a tendency for the flame retardancy to fail to exhibit the contemplated effect, hence undesirable.

According to the present invention, a silane coupling agent can be incorporated into the composition. Preferred silane coupling agents are trialkoxysilanes having a carbon-to-carbon double bond or epoxy group, such as vinyl-tris(β-methoxyethoxysilane) (A172, product of Nippon Unicar Co., Ltd.), γ-methacryloxypropyltrimethoxysilane (A174, product of the same company), β-(3,4-epoxycyclohexyl)ethyltrimethoxysilane (A186, product of the same company), γ-glycidyloxy propyltrimethoxysilane (SH6040, Toray Silicone Co., Ltd.), etc. Among these, γ-methacryloxypropyltrimethoxy silane is more preferable.

The coupling agent is used usually in an amount of about 0.1 to about 5 parts by weight, preferably about 0.3 to about 3 parts by weight, more preferably about 0.3 to about 2 parts by weight, per 100 parts by weight of the component (A). Use of more than 5 parts by weight of the coupling agent is not desirable since the resin composition then obtained tends to exhibit lower flame retardancy and lower heat resistance. Use of less than 0.1 part by weight of the coupling agent tends to result in impaired processability.

It is desirable to incorporate a filler into the present composition. Various known fillers are usable which include, for example, talc such as mistron vapor talc, metal carbonates such as magnesium carbonate and calcium carbonate, metallic oxides such as zinc oxide, magnesium oxide, beryllium oxide, boron oxide and aluminum oxide, clay, anhydrous silica, graphite, barium sulphate, lithopone, etc. Among these, clay, mistron vapor talc and magnesium carbonate are especially preferred.

Such fillers are used usually in an amount of about 5 to about 200 parts by weight, preferably about 10 to about 150 parts by weight, more preferably about 5 to about 50 parts by weight, per 100 parts by weight of the component (A). Use of more than 200 parts by weight of the filler is not desirable since the resulting resin composition tends to exhibit impaired mechanical characteristics. Use of less than 5 parts by weight of the filler fails to produce the contemplated effect and is not desirable.

It is desirable to incorporate a higher fatty acid or a metal salt thereof into the composition of this invention as an processing aid. Examples of useful fatty acids are stearic acid, oleic acid and the like, while examples of useful metal salts are zinc salt, calcium salt and the like.

The higher fatty acid or metal salt thereof is used usually in an amount of about 0.1 to about 10 parts by weight, preferably about 0.5 to about 5 parts by weight, per 100 parts by weight of the component (A). Use of more than 10 parts by weight of the acid or salt tends to result in the drawback that the resin composition obtained exhibits impaired properties, for example, in respect of mechanical characteristics. Presence of less than 0.1 part by weight of the processing aid fails to produce the contemplated effect.

It is desirable to incorporate a copper inhibitor into the composition of this invention. Useful copper inhibitors are a wide variety of those already known, such as N,N'-bis[3-(3',5'-di-tert-butyl-4'-hydroxyphenyl)propionyl]hydrazine, [3-(N-salicyloyl)amino-1,2,4-tetrazole], N,N'-dibenzaloxalyldihydrazide, N,N'-disalicylideneoxalylhyrazide, etc. The copper inhibitor is used usually in an amount of about 0.02 to about 5 parts by weight, preferably about 0.1 to about 2 parts by weight, per 100 parts by weight of the component (A). Use of more than 5 parts by weight of the inhibitor is not desirable economically since a noticeably increased effect will not be achieved. With less than 0.02 part by weight present, it becomes difficult to obtain the contemplated the effect.

It is also desirable to incorporate carbon black into the composition of this invention. Examples of useful carbon black materials include a wide variety of conventional material among which preferred materials are furnace black designated N330 to N351 in ASTM code and 100 to 160 cm$^3$/100 g in DBP oil absorption, and thermal black which is 30 to 50 cm$^3$/100 g in DBP oil absorption. More specifically, preferred materials include FEF carbon black, HAF carbon black, ISAF carbon black, SRF carbon black, etc. More specific examples are Diablack H and Diablack HS (products of Mitsubishi Chemical Industries, Ltd.), Vulcan-3 and Vulcan-3H (products of Cabot Corp.), Seast H and Seast 3H (products of Tokai Electrcde Co., Ltd.), Ketjenblack HAF (product of Ketjen Corp.), etc. Of these, Diablack H and Vulcan-3 are desirable.

According to the present invention, usually about 0.5 to about 200 parts by weight, preferably about 0.5 to about 40 parts by weight, more preferably about 1 to about 20 parts by weight, of carbon black is used per 100 parts by weight of the component (A). Use of more than 200 parts by weight of carbon black is undesirable since the resulting resin composition then tends to exhibit impaired mechanical characteristics. With less than 0.5 part by weight of carbon black present, the composition has difficulty in exhibiting ashing characteristics, hence undesirable.

In addition to the foregoing components, plasticizers, pigments and the like can be incorporated into the composition of this invention.

Examples of useful plasticizers are naphthenic and aromatic plasticizers, process oil, phthalates, trimellitates, epoxy resins, etc. Such plasticizers are used usually in an amount of about 0.2 to about 50 parts by weight, preferably about 1 to about 10 parts by weight, per 100 parts by weight of the component (A).

Examples of useful pigments are Phthalocyanine Blue, Chrome Yellow, red iron oxide, etc. These pigments are used usually in an amount of about 0.1 to about 20 parts by weight, preferably about 5 to about 10 parts by weight, per 100 parts by weight of the component (A).

The resin composition of the present invention is used as crosslinked. The composition may be crosslinked using, for example, organic peroxide, electron rays or radiation. Preferably the composition is crosslinked with use of an organic peroxide or electron rays.

The composition of the present invention can be prepared by uniformly mixing together specified amounts of the desired components given above by a usual method, using a Banbury mixer, Henschel mixer or the like. Although all the components can be mixed together at the same time, it is desirable to admix the coupling agent along with the filler. When two or more kinds of polymers are used as the component (A), it is desirable to uniformly mix the polymers together and to admix the other components with the mixture.

The composition of this invention can be molded by various known methods for use. For example, the composition is kneaded by a kneader such as a rolling mill and then shaped into the desired form for the contemplated use.

Since the composition of the present invention is essentially free from halogen, the composition will not produce smoke or release any corrosive gas or acid gas owing to thermal decomposition even if allowed to stand in flames of high temperature, for example, in the event of a fire. Moreover, the composition of this invention is outstanding in flame retardancy, tensile strength, electrical characteristics, resistance to aging, etc. The composition is therefore useful as a building material, material for pipes, hoses, sheets, sheet covers and walls, covering materials for electric wires and cables (for inner insulations and outer sheaths), etc.

Above all, the composition of the invention is well-suited for use as a flame-retardant resin composition for covering insulations and sheaths of electric wires and cables. In such a case, the composition of this invention is used for electrical insulation layers over suitable portions, for example, over conductors or inner semiconductive layers, of communication cables, power cables, control cables, etc. The composition is usable also for protective layers (sheaths) over suitable portions, e.g., over insulation layers or outer semiconductive layers, of such cables. In these applications, the composition gives the cables high fire resistance, flame retardancy, etc.

The present invention will be described in greater detail with reference to the following examples.

EXAMPLE 1 to 43

Compositions of the present invention were prepared from specified amounts (in parts by weight) of the base polymer, flame retardant, phosphorus-containing titanate coupling agent and other additives listed below in Table 1.

COMPARISON EXAMPLES 1 to 6

For comparison, compositions were prepared from specified amounts of the components listed below in Table 1 in the same manner as above except that the amount and kind of base polymer used are those shown in Table 1. The specimens (compositions) thus obtained were tested for flame retardancy, mechanical properties, volume resistivity and aging properties with the results given also in Table 2.

The specimens prepared in these examples were tested for characteristics by the following methods.

Flame retardancy test

Each of compositions of the present invention in Examples 19 to 31 was kneaded with two rolling mills at room temperature to a temperature of 80° C. for 20 minutes and then cured at 160° C. for 30 minutes under pressure to prepare a specimen sheet 3.0 mm in thickness. The oxygen index (LOI) of the sheet was measured according to JIS K 7201 (oxygen index method) to evaluate the flame retardancy.

Each of compositions of the present invention in Examples 1 to 18 and 32 to 38 and in Comparison Examples 1 to 6 was kneaded with two rolling mills at a temperature of about 120° C. for 20 minutes and then molded at 180° C. for 30 minutes under pressure to prepare a specimen sheet having a thickness of 3.0 mm. The oxygen index (LOI) of the sheet was measured according to JIS K 7201 (oxygen index method) for the evaluation of the flame retardancy.

Each of compositions of the present invention in Examples 39 to 43 was kneaded with two rolling mills at a temperature of about 80° C. for 20 minutes and then molded at 150° C. for 5 minutes under pressure to obtain a specimen sheet having a thickness of 3.0 mm. The sheet was irradiated with electron rays at a total dose of 15 Mrads in air by an electron ray accelerator, Model Diatron DP1000, for crosslinking. The oxygen index (LOI) of the sheet was measured according to JIS K 7201 (oxygen index method) for the evaluation of flame retardancy.

Mechanical characteristics

The composition was kneaded and molded into specimen sheets, 1 mm in thickness, in the same manner as above. The sheets were checked for the following characteristics.

(1) 100% Modulus (kg/mm$^2$) . . . according to ASTM D882.

(2) 200% Modulus (kg/mm$^2$) . . . according to ASTM D882.

(3) Tensile strength (kg/mm$^2$) . . . according to ASTM D882.

(4) Elongation (%) . . . according to ASTM D882.

Compositions of the invention in Examples 19 to 31 were checked according to JIS K 6301, vulcanized rubber testing method, using tensilometer. Those at least 150% in the resulting values of elongation at break were evaluated as being acceptable (marked with O), and those less than 150% as being unacceptable (marked with X).

Electrical characteristics

Each of compositions of the present invention in Examples 19 to 31 was kneaded with rolling mills at room temperature to a temperature of 80° C. for 20 minutes and then cured at 160° C. for 30 minutes under pressure to obtain a specimen sheet having a thickness of 1 mm. Each of compositions of the present invention in Examples 1 to 18 and 32 to 38 and in Comparison Examples 1 to 6 was kneaded with rolling mills at a temperature of about 160° C. for 20 minutes and then cured at 180° C. for 30 minutes under pressure to prepare a specimen sheet having a thickness of 1 mm. Further compositions of the present invention in Examples 39 to 43 were molded and crosslinked in the same manner as used for the specimen sheets for the flame retardancy test to obtain specimen sheets having a thickness of 1 mm. These sheets were evaluated for $\rho$ value (volume resistivity, ohm-cm) according to JIS C 2123.

Aging characteristics

Using the same specimen sheets as employed for determining the electrical characteristics, compositions of the invention in Examples 19 to 31 were checked for residual elongation (%) according to ASTM D573 after allowing the sheets to stand at 135° C. for 7 days. The compositions which were at least 60% in residual elongation of at least 60% were evaluated as being acceptable (O marked), those which were 30-60% as being not fully acceptable (Δmarked), and those which were less than 30% as being unacceptable (X marked).

Using the same specimen sheets as used for determining the electrical characteristics, compositions of the invention in Examples 1 to 18 and 32 to 43 and in Comparison Examples 1 to 6 were checked for residual tensile strength (%) and residual elongation (%) according to ASTM D573 after allowing the sheets to stand at 150° C. for 4 days.

The symbols for components used in the following examples stand for the following.

Base polymers

A-1: EPDM (EP21, product of Nippon Synthetic Rubber Co., Ltd., propylene content=33%)

A-2: EPDM (EP51, product of the same company, propylene content=26%)

A-3: IIR (Polysar Butyl 100, product of Polysar Ltd., Mooney viscosity at 100° C.=41-49)

A-4: IIR (JSR Butyl 268, product of Nippon Synthetic Rubber Co., Ltd., Mooney viscosity at 126.7° C.=50-60)

A-5: EVA (Levapren 450, product of Bayer AG., VA content=45 wt. %)

A-6: EVA (Evatate H2031, product of Sumitomo Chemical Co., Ltd., MFR=1.5, VA content=20 wt. %)

A-7: EVA (NUC-8450, product of Nippon Unicar Co., Ltd., MFR=2, VA content=15 wt. %)

A-8: EVA (Yukalon V505, product of Mitsubishi Petrochemical Co., Ltd., MFR=2.0, VA content=20 wt. %)

A-9: EVA (Evatate H2011, product of Sumitomo Chemical Co., Ltd., MFR=3.0, VA content=15 wt. %)

A-10: EEA (NUC-6570, product of Nippon Unicar Co., Ltd., MFR=20, EA content=25 wt. %)

A-11: EEA (NUC-6220, product of Nippon Unicar Co., Ltd., MFR=4, EA content=7 wt. %)

A-12: EEA (A701, product of Mitsui-Du Pont Polychemical Co., Ltd., MFR=5, EA content=9 wt. %)

A-13: EEA (A170, product of Nippon Petrochemical Co., Ltd., MFR=0.71, EA content=15.6 wt. %)

A-14: EEA (XC-300E, product of Mitsubishi Petrochemical Co., Ltd., MFR=0.4, EA content=12 wt. %)

A-15: linear polyethylene (Ultzex 2020L, product of Mitsui Petrochemical Industries, Ltd., MFR=2.1, density=0.920)

A-16: linear polyethylene (Mitsubishi Polyethylene-LL, H20E, MFR=0.5, density=0.918)

A-17: linear polyethylene (Mitsubishi Polyethylene-LL, F30F, MFR=1.0, density=0.920)

A-18: Poly-α-olefin (Tafmer A 4090, product of Mitsui Petrochemical Industries, Ltd., MFR=3.6, density=0.88)

A-19: Linear polyethylene (Neozex 2006, product of Mitsui Petrochemical Industries, Ltd., MFR=0.7, density=0.922)

Flame retardants

B-1: Al(OH)$_3$ (Hygellite H42M, product of Showa Light Metal Co., Ltd.)

B-2: Mg(OH)$_2$ (KISUMA 5B, product of Kyowa Kagaku Kogyo Co., Ltd.)

B-3: Mg(OH)$_2$ (KX-4S, product of Asahi Glass Co., Ltd.)

Coupling agents

C-1: isopropyl tris(dioctylpyrophosphate)titanate (KR38S, product of Kenrich Petrochemicals, Inc.)

C-2: bis(dioctylpyrophosphate)oxyacetate-titanate (KR138S, product of Kenrich Petrochemicals, Inc.)

C-3: tetraisopropyl bis(dilaurylphosphite)titanate (KR-36C, product of Kenrich Petrochemicals, Inc.)

C-4 tetra(2,2-diallyloxymethyl-1-butoxy) di-(ditridecyl)phosphitetitanate (KR55, product of Kenrich Petrochemicals, Inc.)

C-5: bis(dioctylpyrophosphate)ethylene-titanate (KR-238S, product of Kenrich Petrochemicals, Inc.)

Additives

D-1: antioxidant (MB, product of Ohuchi Shinko Co., Ltd.)

D-2: antioxidant (tetrakis[methylene-3-(3,5-di-tert-butyl-4-hydroxyphenyl)propionate]methane, Irganox 1010, product of Ciba Geigy Corp.)

D-3: antioxidant (4,4'-dihydroxy-3,3'-di-tert-butyl-5,5'-dimethyldiphenylsulfide, Nocrac 300, product of Ohuchi Shinko Co., Ltd.)

D-4: antioxidant (2,2-thio[diethyl-bis-3-(3,5-di-tert-butyl-4-hydroxyphenol)propionate], Irganox 1035, product of Ciba Geigy Corp.)

D-5: antioxidant (Antioxidant DDA, product of Bayer AG.)

D-6: antioxidant (2,2'-methylenebis(4-methyl-6-tert-butylphenol), Nocrac NS-6, product of Ohuchi Shinko Co., Ltd.)

D-7: red phosphorus (Novared #120, product of Rin-kagaku Co., Ltd.)

D-8: zinc borate (Zinc Borate #2335, product of Borax Holding Ltd.)

D-9: titanium dioxide (Titone A150, product of Sakai Kagaku Co., Ltd.)

D-10: Silane coupling agent ($\gamma$-methacryloxypropyl-trimethoxysilane, A174, product of Nippon Unicar Co., Ltd.)

D-11: dicumyl peroxide (DCP, product of Mitsui Petrochemical Industries, Ltd.)

D-12: Perbutyl P (product of Nippon Oils & Fats Co., Ltd.)

D-13: Kayabutyl C (product of Kayaku Nouly Corp.)

D-14: auxiliary crosslinking agent (triacryloylhexahydro-1,3,5-triazine, TAF, product of Daito Kagaku Co., Ltd.)

D-15: triallyl isocyanurate (TAIC, product of Nippon Suiso Kogyo Co., Ltd.)

D-16: zinc oxide

D-17: magnesium carbonate

D-18: stearic acid

D-19: zinc stearate

D-20: copper inhibitor (MARK CDA-1, product of Adekarargus Chemical Co., Ltd.)

D-21: copper inhibitor (Tinuvin 320, product of Ciba Geigy Corp.)

D-22: HAF carbon (Diablack H, product of Mitsubishi Chemical Industries, Ld.)

D-23: HAF carbon (Valcan-3, product of Cabot Corp.)

D-24: process oil (naphthenic, Sansen 4240, product of Nippon San Sekiyu Co., Ltd., viscosity=15–20 cst., specific gravity=0.920)

D-25: Aerosil ($SiO_2$, product of Nippon Aerosil Co., Ltd.)

D-26: Seenox 412S (product of Shiraishi Calcium Co., Ltd.)

D-27: Tetramethylthiuram disulfide (Nocceler TT, product of Ohuchi Shinko Co., Ltd.)

D-28 2-Mercaptobenzothiazole (Nocceler M, product of Ohuchi Shinko Co., Ltd.)

TABLE 1

| Component | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Base polymer | | | | | | | | | | | | | | | | | | | | | | | | | |
| A-1 | 100 | — | — | — | — | — | — | — | — | — | — | — | — | — | — | — | — | — | — | — | 30 | — | — | — | 100 |
| A-2 | — | 100 | — | — | — | — | — | — | — | — | — | — | — | — | — | — | — | — | — | — | 70 | 100 | 100 | 100 | — |
| A-3 | — | — | 100 | — | — | — | — | — | — | — | — | — | — | — | — | — | — | — | — | — | — | — | — | — | — |
| A-4 | — | — | — | 100 | — | — | — | — | — | — | — | — | — | — | — | — | — | — | 100 | — | — | — | — | — | — |
| A-5 | — | — | — | — | 100 | — | — | — | — | — | — | — | — | — | — | — | — | — | — | 100 | — | — | — | — | — |
| A-6 | — | — | — | — | — | 100 | — | 92 | 92 | — | — | — | — | — | — | — | — | — | — | — | — | — | — | — | — |
| A-7 | — | — | — | — | — | — | 100 | — | — | — | — | — | — | — | — | — | — | — | — | — | — | — | — | — | — |
| A-8 | — | — | — | — | — | — | — | — | — | 100 | 100 | — | — | — | — | — | — | — | — | — | — | — | — | — | — |
| A-9 | — | — | — | — | — | — | — | — | — | — | — | 100 | — | — | — | — | — | — | — | — | — | — | — | — | — |
| A-10 | — | — | — | — | — | — | — | — | — | — | — | — | 100 | — | — | — | — | 92 | — | — | — | — | — | — | — |
| A-11 | — | — | — | — | — | — | — | — | — | — | — | — | — | 100 | — | — | 92 | — | — | — | — | — | — | — | — |
| A-12 | — | — | — | — | — | — | — | — | — | — | — | — | — | — | 100 | — | — | — | — | — | — | — | — | — | — |
| A-13 | — | — | — | — | — | — | — | — | — | — | — | — | — | — | — | 100 | — | — | — | — | — | — | — | — | — |
| A-14 | — | — | — | — | — | — | — | — | — | — | — | — | — | — | — | — | — | — | — | — | — | — | — | — | — |
| A-15 | — | — | — | — | — | — | — | 8 | 8 | — | — | — | — | — | — | — | — | — | — | — | — | — | — | — | — |
| A-16 | — | — | — | — | — | — | — | — | — | — | — | — | — | — | — | — | 8 | 8 | — | — | — | — | — | — | — |
| A-17 | — | — | — | — | — | — | — | — | — | — | — | — | — | — | — | — | — | — | — | — | — | — | — | — | — |
| Flame retardant | | | | | | | | | | | | | | | | | | | | | | | | | |
| B-1 | 100 | — | — | 100 | 100 | — | 150 | 100 | 100 | 100 | 150 | 120 | 120 | 120 | 120 | 120 | 100 | 100 | 170 | 170 | 150 | 170 | 170 | 170 | 170 |
| B-2 | — | 120 | 120 | — | — | 120 | — | — | — | — | — | — | — | — | — | — | — | — | — | — | — | — | — | — | — |
| B-3 | — | — | — | — | — | — | — | — | — | — | — | — | — | — | — | — | — | — | — | — | — | — | — | — | — |
| Coupling Agent | | | | | | | | | | | | | | | | | | | | | | | | | |
| C-1 | 1 | 1 | 1 | 1 | 1 | — | — | 0.5 | 1 | 1 | 1 | 0.5 | 0.5 | 0.5 | 0.5 | 0.5 | 1.0 | 1.0 | 1 | 1 | 1 | 1 | 1 | — | 3 |
| C-2 | — | 1 | — | — | — | — | — | 0.5 | — | — | — | — | — | — | — | — | — | — | — | — | — | — | — | 1 | — |
| C-3 | — | — | — | — | — | 1 | 0.5 | — | — | — | — | — | — | — | — | — | — | — | — | — | — | — | — | — | — |
| C-4 | — | — | — | — | — | 0.3 | 0.3 | — | — | — | — | — | — | — | — | — | — | — | — | — | — | — | — | — | — |
| C-5 | — | — | — | — | — | — | — | — | — | — | — | — | — | — | — | — | — | — | — | — | — | — | — | — | — |
| Other Additives | | | | | | | | | | | | | | | | | | | | | | | | | |
| D-1 | 1 | — | 1 | 1 | — | 1 | 1 | 1 | 1 | — | — | 1 | — | — | — | — | — | — | 2 | 2 | 2 | 2 | 2 | 2 | 2 |
| D-2 | — | 0.5 | — | — | 0.5 | — | — | — | — | 0.5 | 0.5 | — | — | 0.5 | 0.5 | 0.5 | — | — | 0.5 | 0.5 | 0.5 | — | — | — | — |
| D-3 | — | 0.5 | — | — | 0.5 | — | — | — | — | 0.5 | 0.5 | — | — | 0.5 | 0.5 | 0.5 | — | — | — | — | — | — | — | — | — |
| D-4 | — | — | — | — | — | — | — | — | — | — | — | — | — | — | — | — | — | — | — | — | — | — | — | — | — |
| D-5 | — | — | — | — | — | — | — | — | — | — | — | — | — | — | — | — | — | — | — | — | — | — | — | — | — |
| D-6 | — | — | — | — | — | — | — | — | — | — | — | — | — | — | — | — | — | — | — | — | — | — | — | — | — |
| D-7 | — | — | — | — | — | — | — | — | — | — | — | — | — | — | — | — | — | — | — | — | — | — | — | — | — |
| D-8 | — | — | — | — | — | — | — | — | — | — | — | — | — | — | — | — | — | — | — | — | — | — | — | — | — |
| D-9 | — | — | — | — | — | — | — | — | 5 | — | — | — | — | — | — | — | — | — | — | — | — | — | — | — | — |
| D-10 | — | — | — | — | — | 2 | 2 | — | — | — | — | — | — | — | — | — | — | — | — | — | — | — | — | — | — |
| D-11 | — | — | — | 2.5 | 2.5 | — | — | — | — | — | — | — | — | — | — | — | — | — | — | — | — | — | — | — | — |
| D-12 | — | — | — | — | — | — | — | — | — | — | — | — | — | — | — | — | — | — | — | — | — | — | — | — | — |
| D-13 | — | — | — | — | — | — | — | — | — | — | — | — | — | — | — | — | — | — | — | — | — | 2.7 | 2.7 | 2.7 | 2.7 |
| D-14 | 2.5 | 2.5 | 2.5 | — | — | — | — | 2.5 | 2.5 | 2.5 | 2.5 | 2.5 | 2.5 | 2.5 | 2.5 | 2.5 | 2.5 | 2.5 | — | — | — | — | — | — | — |
| D-15 | — | — | — | — | — | — | 5 | 5 | 1 | — | — | — | — | — | — | — | — | — | 10 | 10 | 10 | 10 | 10 | 10 | 10 |
| D-16 | — | — | — | — | — | — | — | — | — | — | — | — | — | — | — | — | — | — | — | — | 20 | — | — | 50 | — |
| D-17 | 1 | 1 | 2 | 2 | — | — | — | 1 | 1 | 1 | — | 1 | — | 1 | 1 | 1 | — | — | 1 | 1 | 1 | 1 | 1 | 1 | — |
| D-18 | — | — | — | — | 0.5 | 1.5 | — | — | — | — | — | — | — | — | — | — | — | — | — | — | — | — | — | — | — |
| D-19 | — | — | — | — | 0.5 | 0.5 | — | — | — | — | — | — | — | — | — | — | — | — | — | — | — | — | — | — | — |
| D-20 | — | — | — | — | — | — | — | — | — | — | — | — | — | — | — | — | — | — | — | — | — | — | — | — | — |
| D-21 | — | — | — | — | — | — | — | — | — | — | — | — | — | — | — | — | — | — | — | — | — | — | — | — | — |

TABLE 1-continued

| Component | 26 | 27 | 28 | 29 | 30 | 31 | 32 | 33 | 34 | 35 | 36 | 37 | 38 | 39 | 40 | 41 | 42 | 43 | 1 | 2 | 3 | 4 | 5 | 6 |
|---|---|---|---|---|---|---|---|---|---|---|---|---|---|---|---|---|---|---|---|---|---|---|---|---|
| D-22 | | | | | | | | | | | | | | | | | | | 5 | 5 | | | | |
| D-23 | | | | | | | | | | | | | | | | | | | 5 | 5 | | | | |
| D-24 | | | | | | | | | | | | | | | | | | | | 5 | | | | 5 |
| D-25 | | | | | | | | | | | | | | | | | | | | | | | | |
| D-26 | | | | | | | | | | | | | | | | | | | | | | | | |
| D-27 | | | | | | | | | | | | | | | | | | | 1.5 | 2.0 | | | | |
| D-28 | | | | | | | | | | | | | | | | | | | 1.5 | 1.0 | | | | |

|  | Example No. | | | | | | | | | | | | | | | | | | Comparison Example No. | | | | | |
|---|---|---|---|---|---|---|---|---|---|---|---|---|---|---|---|---|---|---|---|---|---|---|---|---|
| Component | 26 | 27 | 28 | 29 | 30 | 31 | 32 | 33 | 34 | 35 | 36 | 37 | 38 | 39 | 40 | 41 | 42 | 43 | 1 | 2 | 3 | 4 | 5 | 6 |
| Base Polymer | | | | | | | | | | | | | | | | | | | | | | | | |
| A-1 | 100 | | | 100 | 70 | | | | | | | | | | | | | | | | | | | |
| A-2 | | 100 | 100 | | | 95 | | | | | | | | | | | | | | | | | | |
| A-3 | | | | | | | | | | | | | | | | | | | | | | | | |
| A-4 | | | | | 30 | | | | | | | 10 | | | | | | | | | | | | |
| A-5 | | | | | | | | | | | | | | | | | | | | | | | | |
| A-6 | | | | | | | 50 | 50 | 50 | 50 | 90 | 90 | 95 | 100 | 100 | 100 | 100 | 100 | | | | | | |
| A-7 | | | | | | | | | | | | | | | | | | | 70 | 70 | | | 70 | 70 |
| A-8 | | | | | | | | | | | | | | | | | | | | | | | | |
| A-9 | | | | | | | | | | | | | | | | | | | | | | | | |
| A-10 | | | | | | | | | | | | | | | | | | | | | | | | |
| A-11 | | | | | | | 50 | 50 | 50 | 50 | | | | | | | | | | | | | | |
| A-12 | | | | | | | | | | | | | | | | | | | | | | | | |
| A-13 | | | | | | | | | | | | | | | | | | | | | | | | |
| A-14 | | | | | | | | | | | | | | | | | | | | | | | | |
| A-15 | | | | | | 5 | | | | | | | | | | | | | | | | | | |
| A-16 | | | | | | | | | | | | | | 5 | | | | | 30 | 30 | | | 30 | 30 |
| A-17 | | | | | | | | | | | | | | | | | | | | | | | | |
| A-18 | | | | | | | | | | | | | | | | | | | | | 50 | 50 | | |
| A-19 | | | | | | | | | | | | | | | | | | | | | 50 | 50 | | |
| Flame retardant | | | | | | | | | | | | | | | | | | | | | | | | |
| B-1 | 170 | 120 | | 140 | 170 | 120 | 120 | 120 | 120 | 120 | 120 | | 120 | | 100 | 120 | 120 | 100 | 100 | 100 | | | 100 | 100 |
| B-2 | | | 100 | | | | | | | | | 120 | | 100 | | | | | | | 150 | 150 | | |
| B-3 | | | | | | | | | | | | | | | | | | | | | | | | |
| Coupling Agent | | | | | | | | | | | | | | | | | | | | | | | | |
| C-1 | 3 | 1 | 2 | 1 | 1 | | 1 | 1 | 1 | 1 | 1 | 1 | | 1 | 1 | 1 | 1 | 1 | 1 | 1 | | | 1 | 1 |
| C-2 | | | | | | | | | | | | | 0.5 | | | | | | | | | | | |
| C-3 | | | | | | | | | | | | | | | | | | | | | | | | |
| C-4 | | | | | | | | | | | | | 0.5 | | | | 0.5 | 1.5 | | | | | | |
| C-5 | | | | | | | | | | | | | | | | | | | | | | | | |
| Other Additives | | | | | | | | | | | | | | | | | | | | | | | | |
| D-1 | 2 | 2 | 4 | 2 | 2 | 2 | | | | | | | 0.5 | | | | | | | | | | | |
| D-2 | | | | | | | | | | | | | 0.5 | | | | | | | | | | | |
| D-3 | | | | | | 1 | | | | | | | | | | | | | | | | | | |
| D-4 | | | | | | | 0.3 | 0.3 | 0.3 | 0.3 | | | | | | | | | 0.3 | 0.3 | 0.5 | 0.5 | 0.5 | 0.5 |
| D-5 | | | | 0.5 | 0.5 | 0.5 | | | | | 0.5 | 0.5 | | | | | | | | | | | | |
| D-6 | | | | | | | | | | | 0.5 | 0.5 | | | | | | | | | | | | |
| D-7 | | | | | | | | | | | 5 | 5 | 5 | | | | | | | | | | | |
| D-8 | | 30 | 50 | 30 | | 30 | | | | | | | | | | | | 5 | | | | | | |
| D-9 | | | | | | | | | | | | | | | | | | | | | | | | |
| D-10 | | | | | | | | | | | | | | | | | | | | | | | | |
| D-11 | 2.7 | 2.7 | 2.7 | 2.7 | 2.7 | 2.7 | | | | | | | | | | | | | | | | | | 2.5 |

TABLE 1-continued

| | | | | | | | | | | | | | | | | | | | | | | | |
|---|---|---|---|---|---|---|---|---|---|---|---|---|---|---|---|---|---|---|---|---|---|---|---|
| D-12 | — | — | — | — | — | — | — | — | — | — | — | — | — | — | — | — | — | — | — | — | — | — | — |
| D-13 | — | — | — | — | — | — | — | — | — | — | — | — | — | — | — | — | — | — | — | — | — | — | — |
| D-14 | 1 | 1 | 1 | 1 | 1 | 1 | 2.5 | 2.5 | — | — | — | 2.5 | — | — | — | — | — | — | 2.5 | — | 2.5 | — | — |
| D-15 | 10 | 5 | 5 | 5 | 10 | 1.5 | 0.5 | 0.5 | — | — | — | — | — | — | — | — | — | — | — | — | — | — | — |
| D-16 | 20 | 20 | — | 10 | — | 5 | — | — | — | — | — | — | — | — | — | — | — | — | — | — | — | — | — |
| D-17 | — | — | — | — | 1 | 20 | — | — | — | — | — | — | — | — | — | — | — | — | — | — | — | — | — |
| D-18 | — | — | — | — | — | 1 | — | — | — | — | — | — | — | — | — | 1 | 1 | 1 | 1 | 1 | 1 | 1 | 1 |
| D-19 | — | — | — | — | — | — | 2 | 2 | — | — | 2 | — | — | — | — | — | — | — | — | — | — | — | — |
| D-20 | — | — | — | — | — | — | — | — | 0.5 | 0.5 | — | — | 0.5 | 0.5 | 1.5 | 0.3 | 0.5 | — | — | — | — | — | — |
| D-21 | — | — | — | — | — | — | — | — | — | — | — | — | — | — | 0.5 | — | — | — | — | — | — | — | — |
| D-22 | 5 | 5 | 5 | 5 | 5 | — | — | — | 5 | 5 | 5 | 5 | — | — | — | 5 | 5 | — | — | — | — | — | — |
| D-23 | 5 | 5 | 5 | 5 | 5 | 5 | — | — | — | — | — | — | 1.5 | 1.5 | — | — | — | — | — | — | — | — | — |
| D-24 | — | — | — | — | — | — | — | — | — | — | — | — | 1.5 | 1.5 | 1.5 | 1 | — | 1 | — | — | — | — | — |
| D-25 | — | — | — | — | — | — | — | — | — | — | — | — | — | — | — | — | — | — | — | — | — | — | — |
| D-26 | — | — | — | — | — | — | — | — | — | — | — | — | — | — | — | — | — | — | — | — | — | — | — |
| D-27 | — | — | — | — | — | — | — | — | 0.5 | 0.5 | 0.5 | — | — | — | — | — | — | — | — | — | — | — | — |
| D-28 | — | — | — | — | — | — | — | — | 0.5 | 0.5 | 0.5 | — | — | — | — | — | — | — | — | — | — | — | — |

TABLE 2

| Characteristics | Example No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Flame retardancy (LOI) | 27.8 | 30.3 | 31.4 | 29.8 | 30.3 | 31.4 | 32.1 | 31.1 | 32.1 | 28.9 | 42.5 | 28.4 | 31.4 | 29.6 | 31.4 | 32.1 | 28.9 |
| Mechanical properties | | | | | | | | | | | | | | | | | |
| (1) | — | — | — | — | — | — | — | — | — | — | — | — | — | — | — | — | — |
| (2) | 0.67 | 0.69 | 0.62 | 0.66 | 0.72 | 0.73 | 0.72 | 0.64 | 0.60 | — | — | 0.72 | 0.81 | 0.88 | 0.81 | 0.76 | — |
| (3) | 1.98 | 1.86 | 1.92 | 2.25 | 2.10 | 2.09 | 1.72 | 1.56 | 1.66 | 1.98 | 1.51 | 1.87 | 1.79 | 1.86 | 1.84 | 1.79 | 1.82 |
| (4) | 440 | 485 | 462 | 535 | 520 | 550 | 460 | 570 | 585 | 560 | 490 | 420 | 435 | 495 | 500 | 510 | 460 |
| Volume resistivity $\rho$, ohm-cm ($\times 10^{15}$) | 0.6 | 0.51 | 0.8 | 1.6 | 0.95 | 0.4 | 0.35 | 4.3 | 0.9 | 4.85 | 0.2 | 4.2 | 1.2 | 1.5 | 3.6 | 0.8 | 3.8 |
| Aging properties | | | | | | | | | | | | | | | | | |
| Residual tensile strength (%) | 101 | 96 | 97 | 101 | 102 | 96 | 92 | 90 | 92 | 90 | 93 | 101 | 105 | 100 | 92 | 94 | 98 |
| Residual elongation (%) | 86 | 88 | 84 | 100 | 91 | 94 | 90 | 93 | 90 | 98 | 92 | 88 | 80 | 83 | 84 | 92 | 90 |

| Characteristics | Example No. | | | | | | | | | | | | | | | |
|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 |
| Flame retardancy (LOI) | 29.2 | 29.8 | 30.3 | 29.8 | 30.3 | 29.8 | 29.8 | 31.4 | 34.5 | 30.3 | 28 | 30.3 | 30.3 | 31.4 | 30.3 | 28.4 |
| Mechanical properties | | | | | | | | | | | | | | | | |
| (1) | — | — | — | — | — | — | — | — | — | — | — | — | — | — | — | — |
| (2) | — | — | — | — | — | — | — | — | — | — | — | — | — | — | — | — |
| (3) | 1.84 | — | — | — | — | — | — | — | — | — | — | — | — | — | 1.75 | 1.74 |
| (4) | 465 | | | | | | | | | | | | | | 496 | 490 |
| Volume resistivity $\rho$, ohm-cm ($\times 10^{15}$) | 4.5 | 0.6 | 0.9 | 1.2 | 5.0 | 3.5 | 4.0 | 3.0 | 2.0 | 2.5 | 0.7 | 1.0 | 2.8 | 2.9 | 1.5 | 2.1 |
| Aging properties | | | | | | | | | | | | | | | | |
| Residual tensile strength (%) | 97 | — | — | — | — | — | — | — | — | — | — | — | — | — | 98 | 99 |
| Residual elongation (%) | 89 | | | | | | | | | | | | | | 85 | 90 |

| Characteristics | Example No. | | | | | | | | | | Comparison Example No. | | | | | |
|---|---|---|---|---|---|---|---|---|---|---|---|---|---|---|---|---|
| | 34 | 35 | 36 | 37 | 38 | 39 | 40 | 41 | 42 | 43 | 1 | 2 | 3 | 4 | 5 | 6 |
| Flame retardancy (LOI) | 28.4 | 29.2 | 29.2 | 30.3 | 35.4 | 31.2 | 31.9 | 32.2 | 30.3 | 32.2 | 28.0 | 28.9 | 28.9 | 29.4 | 28.4 | 28.9 |
| Mechanical properties | | | | | | | | | | | | | | | | |
| (1) | — | — | — | — | — | 0.62 | 0.58 | 0.55 | 0.42 | 0.45 | — | — | — | — | — | — |
| (2) | — | — | — | — | — | — | — | — | — | — | — | — | — | — | — | — |
| (3) | 1.80 | 1.77 | 1.69 | 1.76 | 1.70 | 0.81 | 0.80 | 0.79 | 0.82 | 0.85 | 0.90 | 0.95 | 0.86 | 0.90 | 0.91 | 0.98 |
| (4) | 500 | 495 | 485 | 465 | 480 | 400 | 410 | 420 | 395 | 400 | 530 | 480 | 550 | 520 | 360 | 400 |
| Volume resistivity $\rho$, ohm-cm ($\times 10^{15}$) | 1.9 | 2.0 | 0.9 | 1.2 | 2.5 | 0.10 | 0.05 | 0.08 | 0.15 | 0.14 | 1.0 | 0.9 | 0.4 | 0.3 | 5 | 5.2 |
| Aging properties | | | | | | | | | | | | | | | | |
| Residual tensile strength (%) | 100 | 97 | 99 | 101 | 90 | 82 | 84 | 86 | 83 | 82 | 0 | 92 | 0 | 90 | 0 | 90 |
| Residual elongation (%) | 92 | 92 | 90 | 88 | 92 | 92 | 80 | 76 | 74 | 71 | 0 | 86 | 0 | 80 | 0 | 82 |

Table 2 reveals that the sheets prepared from the compositions of the invention have outstanding characteristics.

COMPARISON EXAMPLES 7 to 12

Compositions were prepared in the same manner as in Example 15 with the exception of using polyethylacrylate, polymethacrylate or ethylene acrylic elastomer. The specimens thus obtained were tested for frame retardancy, mechanical properties and volume resistivity. Table 3 below shows the results.

Each of compositions in Comparison Examples 7 and 8, each of compositions in Comparison Examples 9 and 10 and each of compositions in Comparison Examples in 11 and 12 were kneaded with two rolling mills at temperatures respectively of 150° C., 140° C. and 80° C., for the same period of 10 minutes, and then cured at the same temperature of 180° C. for the same period of 30 minutes.

TABLE 3

| | Example No. | Comparison Example No. | | | | | |
|---|---|---|---|---|---|---|---|
| | 15 | 7 | 8 | 9 | 10 | 11 | 12 |
| Base Polymer | | | | | | | |
| EEA (A-13) | 100 | — | — | — | — | — | — |
| Polyethylacrylate (a) | — | 100 | 100 | — | — | — | — |
| Polymethacrylate (b) | — | — | — | 100 | 100 | — | — |
| Ethylene acrylic elastomer (c) | — | — | — | — | — | 100 | 100 |
| Flame retardant | | | | | | | |
| B-1 | — | — | — | — | — | — | 120 |
| B-2 | 120 | 100 | 120 | 100 | 120 | 100 | — |
| Coupling Agent | | | | | | | |
| C-1 | — | — | — | 1.0 | — | — | — |
| C-2 | 0.5 | 0.5 | 0.5 | — | — | 1.0 | — |
| C-3 | — | — | — | — | 1.0 | — | 1.0 |
| Other Additives | | | | | | | |
| D-3 | 0.5 | 0.5 | 0.5 | — | — | — | — |
| D-4 | 0.5 | 0.5 | 0.5 | — | — | — | — |
| D-11 | — | — | — | — | — | 2.5 | 2.5 |
| D-12 | 2.5 | 2.5 | 2.5 | — | — | — | — |

TABLE 3-continued

|  | Example No. 15 | Comparison Example No. | | | | | |
|---|---|---|---|---|---|---|---|
|  |  | 7 | 8 | 9 | 10 | 11 | 12 |
| D-13 | — | — | — | 2.5 | 2.5 | — | — |
| D-19 | 1.0 | 1.0 | 1.0 | 1.0 | 1.0 | 1.0 | 1.0 |
| Flame retardancy LOI | 31.4 | 28.1 | 28.5 | 28.1 | 28.5 | 28.9 | 29.4 |
| Mechanical properties |  |  |  |  |  |  |  |
| T.S., kg/mm² | 1.84 | 0.32 | 0.26 | 0.44 | 0.41 | 0.72 | 0.70 |
| Elo., % | 500 | 180 | 160 | 220 | 210 | 330 | 315 |
| Volume resistivity ohm-cm (× 10¹⁵) | 3.6 | 2.0 | 3.1 | 2.6 | 1.0 | 8.2 | 7.6 |

(a) Toacron AR-601 (product of Toa Paint Co., Ltd.)
(b) Acrypet IR (product of Mitsubishi Rayon Co., Ltd.)
(c) Vamac G (product of E. I. Dupont de Nemours & Co.)

COMPARISON EXAMPLES 13 to 19

The compositions comprising specified amounts (in parts by weight) of components listed below in Table 4 were crosslinked under the same crosslinking conditions as those disclosed in U.S. Pat. No. 4,549,041. The specimens were tested for flame retardancy, mechanical properties and volume resistivity with the results shown in Table 4.

Silane grafted polyolefin resin A:

The resin A is a product prepared by reacting 100 parts of ethylene-α-olefin copolymer (Tafmer A4085, product of Mitsui Petrochemical Industries, Ltd.) with 4 parts of vinyltrimethoxysilane under the same grafting conditions as those taught in U.S. Pat. No. 4,549,041.

Silane grafted polyolefin resin B:

The resin B is a product prepared by reacting 100 parts of ethylene-propylene-diene terpolymer (polymer A-1 used above in Examples) with 4 parts of vinyltrimethoxysilane under the same grafting conditions as above.

Silane grafted polyolefin resin C:

The resin C is a product prepared by reacting 100 parts of ethylene-propylene-diene terpolymer (polymer A-2 used above in Examples) with 4 parts of vinyltrimethoxysilane under the same grafting conditions as above.

TABLE 4

|  | Comparison Example No. | | | | | | |
|---|---|---|---|---|---|---|---|
|  | 13 | 14 | 15 | 16 | 17 | 18 | 19 |
| Si grafted polyolefin resin |  |  |  |  |  |  |  |
| A | 20 | 20 | 20 | 20 | 20 | — | — |
| B | — | — | — | — | — | — | 20 |
| C | — | — | — | — | — | 30 | — |
| Base Polymer |  |  |  |  |  |  |  |
| A-8 | 80 | — | — | — | — | — | — |
| A-9 | — | 80 | — | — | — | — | — |
| A-13 | — | — | 80 | — | — | — | — |
| A-14 | — | — | — | 80 | — | — | — |
| A-1 | — | — | — | — | 80 | 70 | — |
| A-2 | — | — | — | — | — | — | 80 |
| Flame retardant |  |  |  |  |  |  |  |
| B-1 | — | — | — | — | 170 | — | 170 |
| B-2 | 120 | 100 | 120 | — | — | 170 | — |
| B-3 | — | — | — | 120 | — | — | — |
| Coupling Agent |  |  |  |  |  |  |  |
| C-1 | — | — | — | — | 1.0 | — | — |
| C-2 | — | — | 0.5 | 0.5 | — | 3.0 | — |
| C-3 | — | — | — | — | — | — | 1.0 |
| C-4 | 1.0 | 1.0 | — | — | — | — | — |
| C-5 | 1.0 | — | — | — | — | — | — |
| Other Additives |  |  |  |  |  |  |  |
| D-1 | — | — | — | — | 2.0 | 2.0 | 2.0 |
| D-2 | 0.5 | 0.5 | — | — | — | — | — |
| D-3 | 0.5 | 0.5 | 0.5 | 0.5 | — | — | — |
| D-4 | — | — | 0.5 | 0.5 | — | — | — |
| D-14 | — | — | — | 1.0 | — | — | — |
| D-15 | — | — | — | — | 1.0 | 1.0 | 1.0 |
| D-16 | — | — | — | — | 10 | 10 | 10 |
| D-17 | — | — | — | — | — | — | 50 |
| D-18 | 1.0 | 0.5 | — | — | 1.0 | 1.0 | 1.0 |
| D-19 | 1.0 | 0.5 | 1.0 | 1.0 | — | — | — |
| D-24 | — | — | — | — | 5.0 | 5.0 | 5.0 |
| Flame retardancy LOI | 29.4 | 29.8 | 27.6 | 30.3 | 29.8 | 30.3 | 29.8 |
| Mechanical properties |  |  |  |  |  |  |  |
| T.S., kg/mm² | 1.19 | 1.21 | 1.18 | 1.20 | <0.5 | <0.5 | <0.5 |
| Elo., % | 460 | 500 | 510 | 495 | | | |
| Volume resistivity ohm-cm (× 10¹⁵) | 0.63 | 0.90 | 3.0 | 1.0 | 5.5 | 2.6 | 3.3 |
| Corresponding Examples in the Present Invention | Ex. 2 | Ex. 5 | Ex. 15 | Ex. 16 | Ex. 22 | Ex. 25 | Ex. 24 |

The mark in Comp. Ex. 17 to 19 means the elongation is evaluated as acceptable according to the same criterion of evaluation as in Comp. Ex. 19 to 31.

Table 4 shows that the compositions of the invention crosslinked with organic peroxides in corresponding Examples are significantly outstanding in mechanical properties and are high in flame retardancy as compared with the compositions prepared in Comparison Examples 13 to 19.

COMPARISON EXAMPLES 20 to 22

Compositions used are those comprising specified amounts (in parts by weight) of components listed below in Table 5.

TABLE 5

|  | Comparison Example No. | | |
|---|---|---|---|
|  | 20 | 21 | 22 |
| Base polymer |  |  |  |
| polypropylene a | 100 | — | — |
| polypropylene b | — | 100 | — |
| polypropylene c | — | 100 | — |
| Flame retardant |  |  |  |
| B-1 | — | 120 | — |
| B-2 | 120 | — | 100 |
| Coupling agent |  |  |  |
| C-1 | — | 1.0 | — |
| C-2 | 1.0 | — | — |
| C-4 | — | 1.0 | — |
| C-5 | — | — | 1.0 |
| Other Additives |  |  |  |
| D-11 | 2.5 | — | — |
| D-12 | — | 2.5 | — |
| D-13 | — | — | 2.5 | polypropylene a: Norbrene BC-8D (product of Mitsubishi Petrochemical Co., Ltd.)
polypropylene b: SB-210 (product of Mitsui Petrochemical Industries, Ltd.)
polypropylene c: E250G (product of Idemitsu Petrochemical Co., Ltd.)

Using a usual rolling mill at a normal processing temperature of about 160° C. to about 170° C. (i.e. temperature suitable for polypropylene), attempts were made to mix each of the compositions in Comparison Examples 20 to 22, but resulted in failure. The compositions were then subjected to molding procedure but also failed to be molded. This means that polypropylene is not suitable for the present invention.

We claim:

1. A flame-retardant resin composition comprising (A) about 100 parts by weight of at least one resin selected from the group consisting of ethylene-vinyl acetate copolymer, ethylene-ethyl acrylate copolymer, isobutylene-isoprene copolymer and ethylene-propylenediene terpolymer, (B) about 50 to about 300 parts by weight of a hydrate of metallic oxide, and (C) about 0.05 to about 5 parts by weight of a phosphorous-containing titanate coupling agent said phosphorous-containing titanate coupling agent is an organotitanate selected from those represented by the formulas

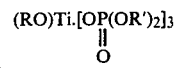

and

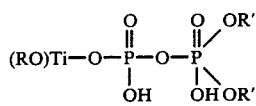

wherein R is alkyl group having 3 to 12 carbon atoms, and R' is alkyl group having 1 to 18 carbon atoms, the composition having been already crosslinked by use of about 0.1 to about 20 parts by weight of a crosslinking agent or by irradiation of ionizable radiation.

2. A composition as defined in claim 1 further comprising linear polyethylene less than 9 wt. % of the component (A).

3. A composition as defined in claim 1 or 2 wherein the hydrate of metallic oxide is at least one member selected from the group consisting of hydrated alumina and hydrated magnesia.

4. A composition as defined in any one of claims 1 to 2 wherein about 70 to about 250 parts by weight of the component (B) and about 0.2 to about 3 parts by weight of the component (C) are used per 100 parts by weight of the component (A).

5. A composition as defined in any one of claims 1 to 2 which has been crosslinked by use of an organic peroxide.

6. A composition as defined in claim 5 further comprising a crosslinking coagent.

7. A composition as defined in claim 6 wherein the crosslinking coagent is at least one compound selected from the group consisting of coagents having at least two groups containing a reactive carbon-to-carbon bond in the molecule.

8. A composition as defined in any one of claims 1 to 2 which, when an isobutylene-isoprene copolymer is used as the component (A), has been crosslinked by use of a crosslinking agent selected from the group consisting of sulfur-containing organic compounds, quinone dioximes and mixtures of phenol-formaldehyde resins and halogenated compounds.

9. A composition as defined in any one of claims 1 to 2 further comprising an antioxidant.

10. A composition as defined in claim 9 wherein the antioxidant is at least one agent selected from the group consisting of antioxidant of the hindered phenol type and antioxidant of the amine type.

11. A composition as defined in claim 9 wherein about 0.1 to about 5 parts by weight of the antioxidant is used per 100 parts by weight of the component (A).